(12) United States Patent
Wu (10) Patent No.: US 10,791,638 B2
(45) Date of Patent: Sep. 29, 2020

(54) LOCKING DEVICE FOR NOTEBOOK COMPUTER

(71) Applicant: SINOX CO., LTD., New Taipei (TW)

(72) Inventor: Chien-Hung Wu, New Taipei (TW)

(73) Assignee: SINOX CO., LTD., New Taipei (TW)

( * ) Notice: Subject to any disclaimer, the term of this patent is extended or adjusted under 35 U.S.C. 154(b) by 0 days.

(21) Appl. No.: 16/512,395

(22) Filed: Jul. 16, 2019

(65) Prior Publication Data

US 2020/0026334 A1 Jan. 23, 2020

(30) Foreign Application Priority Data

Jul. 20, 2018 (TW) .............................. 107209858 U (51) Int. Cl.
*H05K 5/02* (2006.01)
*G06F 1/16* (2006.01)

(52) U.S. Cl.
CPC ......... *H05K 5/0208* (2013.01); *G06F 1/1632* (2013.01); *G06F 1/1679* (2013.01); *H05K 5/0221* (2013.01); *G06F 1/1656* (2013.01); *G06F 1/1683* (2013.01)

(58) Field of Classification Search
CPC .. H05K 5/0208; H05K 5/0221; G06F 1/1679; G06F 1/1632
USPC ......................................... 361/679.57; 70/58
See application file for complete search history.

(56) References Cited

U.S. PATENT DOCUMENTS

| | | | | |
|---|---|---|---|---|
| 4,696,449 A * | 9/1987 | Woo | ..................... | E05B 73/0082 211/8 |
| 6,216,499 B1 * | 4/2001 | Ronberg | ............. | E05B 73/0082 248/551 |
| 6,443,417 B2 * | 9/2002 | Galant | ................ | E05B 73/0082 248/553 |
| 6,763,690 B2 * | 7/2004 | Galant | ................ | E05B 73/0082 248/553 |
| 7,007,912 B1 * | 3/2006 | Giuliani | ............. | E05B 73/0082 248/552 |
| 7,324,333 B2 * | 1/2008 | Allen | ................... | E05B 73/0082 211/8 |
| 8,061,164 B2 * | 11/2011 | Johnston | ............. | E05B 73/0082 70/58 |
| 2007/0290115 A1 * | 12/2007 | Meyer | ................. | E05B 73/0082 248/346.06 |
| 2012/0201000 A1 * | 8/2012 | Allen | ................... | E05B 73/0082 361/679.57 |

(Continued)

*Primary Examiner* — Nidhi Thaker
(74) *Attorney, Agent, or Firm* — Bruce Stone LLP; Joseph A. Bruce (57) ABSTRACT

A locking device for a notebook computer contains: a fixer and a rotatable connection rod. The fixer includes a bottom extension configured to support a bottom of the notebook computer, and the fixer includes a lock body configured to abut against a rear end of the notebook computer. The lock body has at least one orifice configured to connect with a cable lock, and the lock body has a first receiving aperture and a second receiving aperture. The rotatable connection rod includes a rod body rotatably arranged above a keyboard of the notebook computer, a first coupling post and a second coupling post which are rotatably connected with two ends of the rod body respectively. The first coupling post is inserted into the first receiving aperture of a first side of the lock body, and the second coupling post is inserted into a second side of the lock body.

10 Claims, 8 Drawing Sheets

(56) References Cited

U.S. PATENT DOCUMENTS

2018/0252003 A1* 9/2018 Klinkman .......... E05B 73/0082

* cited by examiner

LOCKING DEVICE FOR NOTEBOOK COMPUTER

FIELD OF THE INVENTION

The present invention relates to a locking device for a notebook computer which is applied to lock the notebook computer with an object, thus providing anti-theft function.

BACKGROUND OF THE INVENTION

A conventional notebook computer contains an orifice configured to connect with a cable lock, and the cable lock is connected to an object via a cable, thus providing anti-theft function.

However, the orifice that was present in conventional notebook computers is no longer present due to compact size of notebook computers today.

The present invention has arisen to mitigate and/or obviate the afore-described disadvantages.

SUMMARY OF THE INVENTION

The primary aspect of the present invention is to provide a locking device for a notebook computer which is connected on the notebook computer by way of the fixer and the rotatable connection rod, and the cable lock is fixed on the fixer so that the notebook computer is locked with an object, thus providing an anti-theft function.

Another aspect of the present invention is to provide a locking device for a notebook computer which contains the locker having at least one orifice configured to connect with a cable lock, thus providing safety to the notebook computer.

To obtain the above-mentioned functions, a locking device for a notebook computer provided by the present invention contains: a fixer and a rotatable connection rod.

The fixer includes a bottom extension configured to support a bottom of the notebook computer, and the fixer includes a lock body configured to abut against a rear end of the notebook computer, wherein the lock body has at least one orifice configured to connect with a cable lock, and the lock body has a first receiving aperture and a second receiving aperture which are formed on two sides of the lock body respectively.

The rotatable connection rod includes a rod body rotatably arranged above a keyboard of the notebook computer, a first coupling post and a second coupling post which are rotatably connected with two ends of the rod body respectively, wherein the first coupling post is inserted into the first receiving aperture of a first side of the lock body, and the second coupling post is inserted into a second side of the lock body.

Preferably, the lock body further includes
a fitting tube connected on the bottom extension;
a movable fastener connected with a first end of the fitting tube, the first receiving aperture of a first side of the lock body configured to accommodate the first coupling post;
a retainer connected with a second end of the fitting tube and having a second receiving aperture configured to accommodate the second coupling post; and
a button accommodated in the retainer, wherein the button is received in the retainer and is normally located on a locking position where the second coupling post is located, and the button is released from the locking position to move toward an unlocking position of the second coupling post.

Preferably, the movable fastener is locked on the fitting tube by using a fixing element.

Preferably, the orifice has at least one first orifice defined on the retainer, and the orifice has at least one second orifice defined on the button, wherein number of second orifice is equal the number of first orifice. When the button is located on the locking position, the at least one first orifice aligns with the at least one second orifice respectively.

Preferably, at least one first orifice of the retainer has different sizes, and at least one first orifice of the button has different sizes.

Preferably, the button has an accommodation groove defined therein and communicating with the second receiving aperture, and the button has an engagement protrusion extending to the accommodation groove, wherein the second coupling post has a notch corresponding to the engagement protrusion.

Preferably, the retainer has a resilient element configured to push the button so that the button is located on the locking position normally.

Preferably, the rod body has a first plate rotatably connected with the first coupling post, and the rod body has a second plate rotatably connected with the second coupling post.

Preferably, the first plate has a slot configured to accommodate the second plate.

Preferably, the first plate has multiple hooks, and the second plate has multiple connecting holes connected with the multiple hooks respectively.

DETAILED DESCRIPTION OF THE PREFERRED EMBODIMENTS

With reference to FIGS. 1-4, a locking device 100 for a notebook computer 30 according to a preferred embodiment of the present invention comprises: a fixer 10 and a rotatable connection rod 20.

The fixer 10 includes a bottom extension 11 configured to support a bottom of the notebook computer 30, and the fixer 10 includes a lock body 12 configured to abut against a rear end of the notebook computer 30, wherein the lock body 12 has at least one orifice 13 configured to connect with a cable lock 40, and the lock body 12 has a first receiving aperture 121 and a second receiving aperture 122 which are formed on two sides of the lock body 12 respectively.

The rotatable connection rod 20 includes a rod body 21 rotatably arranged above a keyboard 31 of the notebook computer 30, a first coupling post 22 and a second coupling post 23 which are rotatably connected with two ends of the rod body 21 respectively, wherein the first coupling post 22 is inserted into the first receiving aperture 121 of a first side of the lock body 12, and the second coupling post 23 is inserted into a second side of the lock body 12. The rod body 21 has a first plate 211 rotatably connected with the first coupling post 22, and the rod body 21 has a second plate 212 rotatably connected with the second coupling post 23, the first plate 211 has a slot 2111 configured to accommodate the second plate 212 so as to adjust a length of the rotatable connection rod 20.

Figure 1:
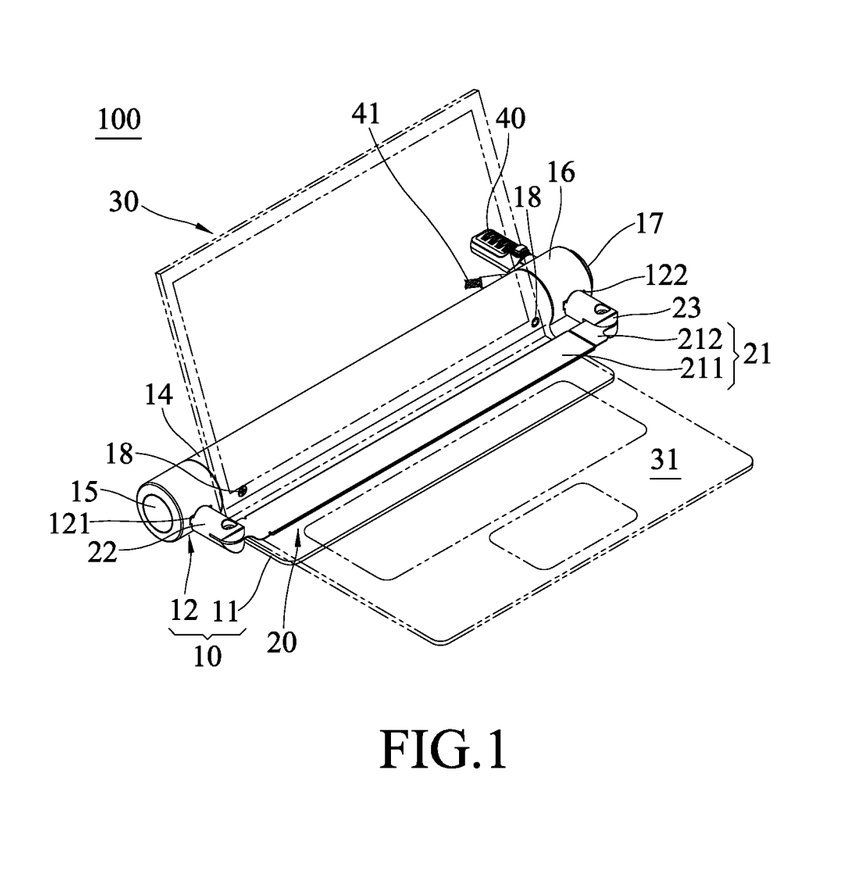
FIG. 1 is a front perspective view of an embodiment of the locking device for a notebook computer.
Figure 2:
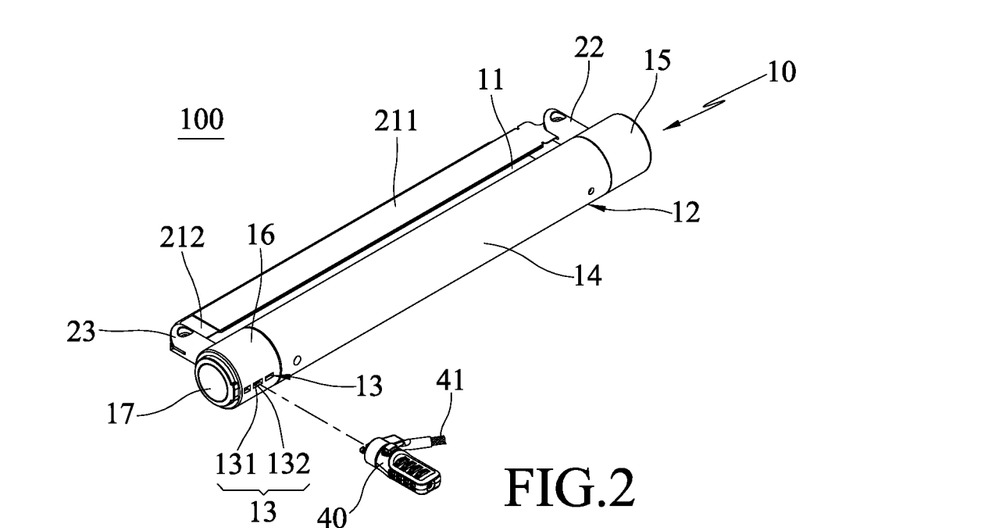
FIG. 2 is a rear perspective view of an embodiment of the the locking device for the notebook computer.
Figure 3:
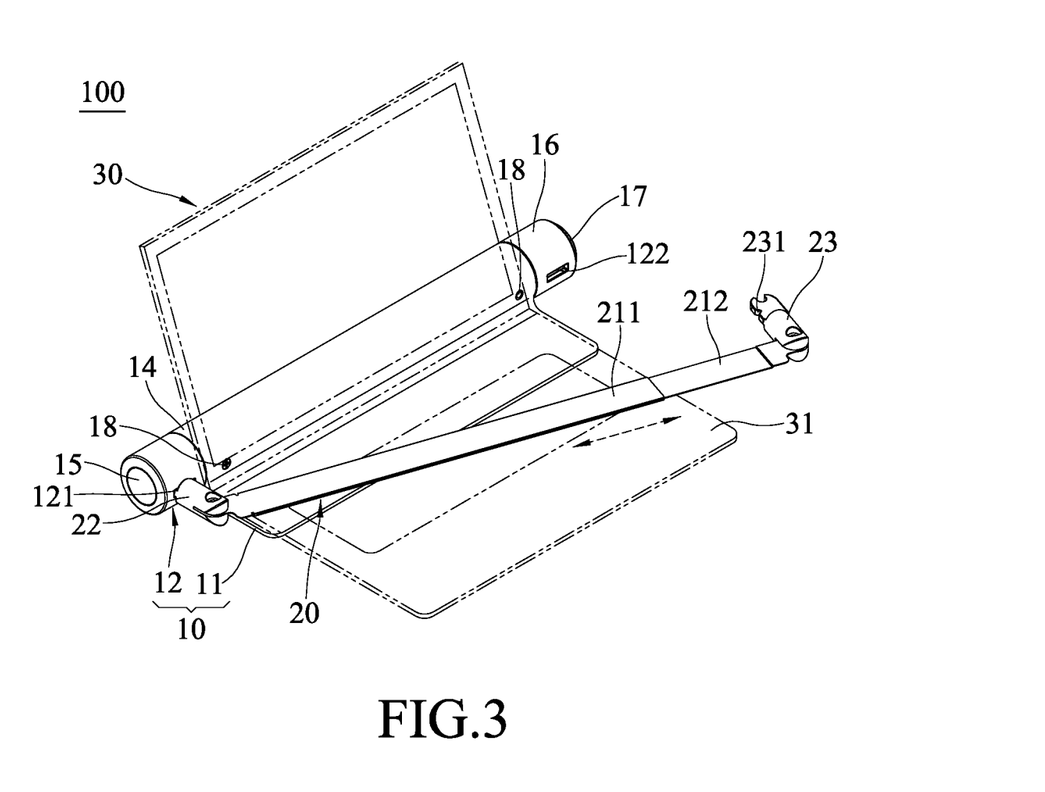
FIG. 3 is a front perspective view showing the operation of an embodiment of the locking device for the notebook computer.
Figure 4:
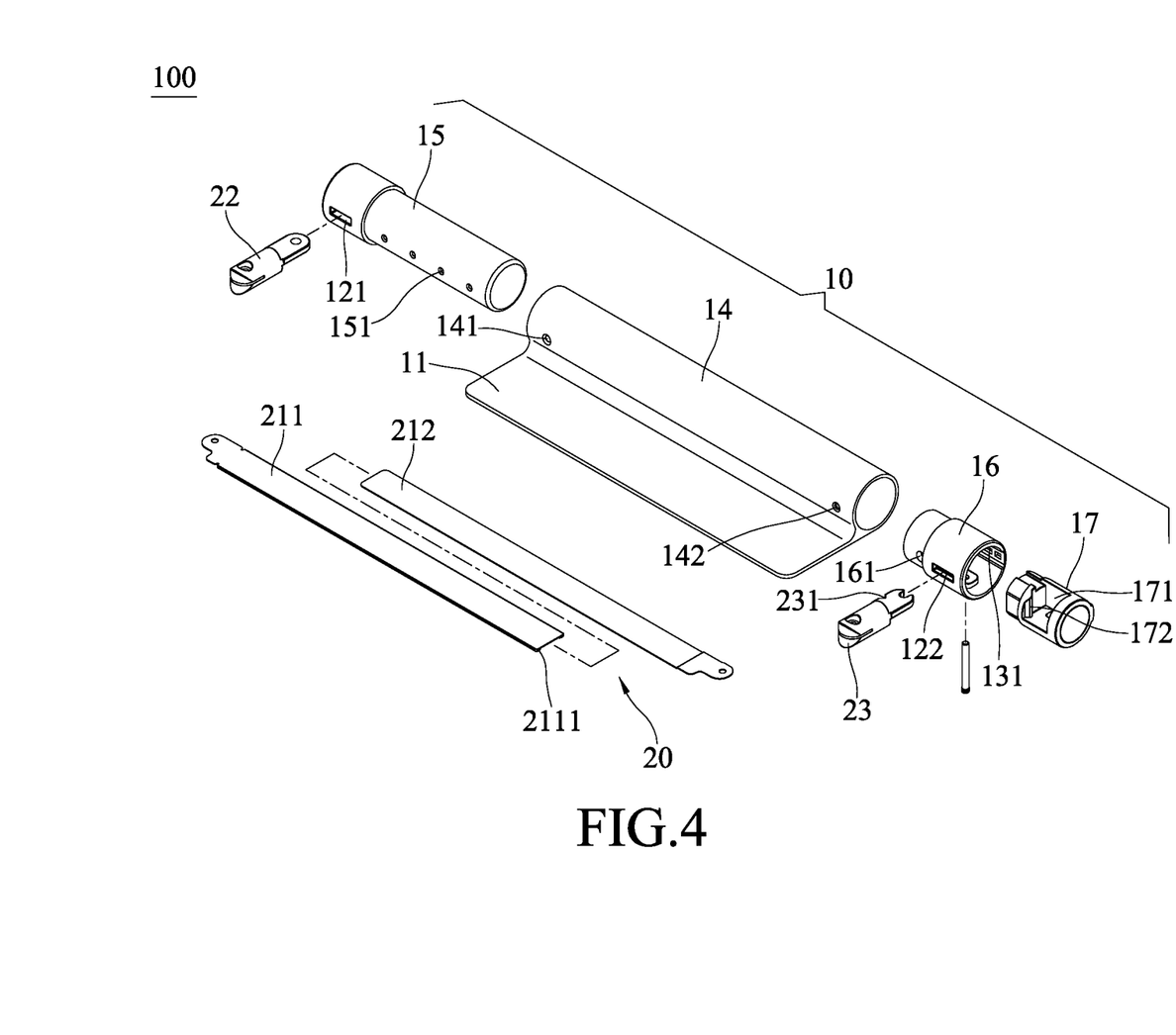
FIG. 4 is a front perspective exploded view showing of an embodiment of the locking device for the notebook computer.
Figure 5:
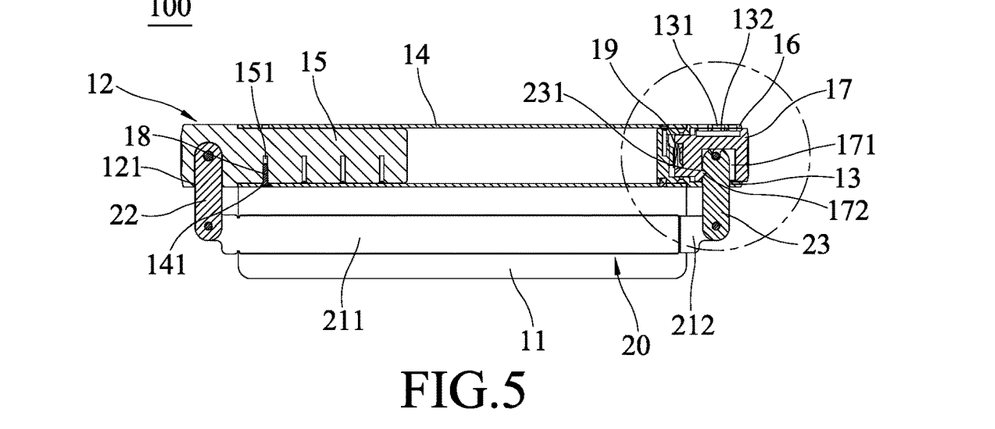
FIG. 5 is a cross sectional view of an embodiment of the locking device for the notebook computer.

Referring to FIGS. 4 and 5, the lock body 12 further has a fitting tube 14 connected on the bottom extension 11, a movable fastener 15 connected with a first end of the fitting tube 14, a retainer 16 connected with a second end of the fitting tube 14, and a button 17 accommodated in the retainer 16.

The fitting tube 14 is hollow and is connected on the bottom extension 11, wherein the fitting tube 14 has two openings defined on two ends thereof individually and has two locating holes 141, 142 defined on an outer wall of the fitting tube 14 adjacent to the two ends of the fitting tube 14 respectively and the bottom extension 11.

Figure 6:
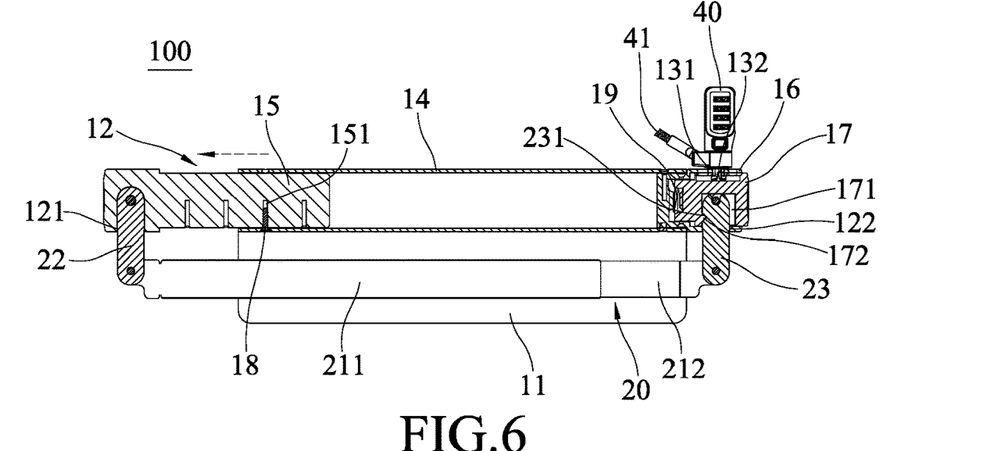
FIG. 6 is a cross sectional view of an embodiment of the locking device for the notebook computer.

The movable fastener 15 is inserted into one of the two ends of the fitting tube 14 and has the first receiving aperture 121 configured to accommodate the first coupling post 22. The movable fastener 15 has multiple first positioning apertures 151 defined thereon so that the movable fastener 15 is locked on the fitting tube 14 by using a fixing element 18 based on a width of the notebook computer 30 (as shown in FIG. 6).

The retainer 16 is inserted into the other end of the fitting tube 14 and has a second receiving aperture 122 configured to accommodate the second coupling post 23. The retainer 16 has a second positioning apertures 161 defined thereon so that the retainer 16 is locked on the fitting tube 14 by using another fixing element 18.

Figure 7A:
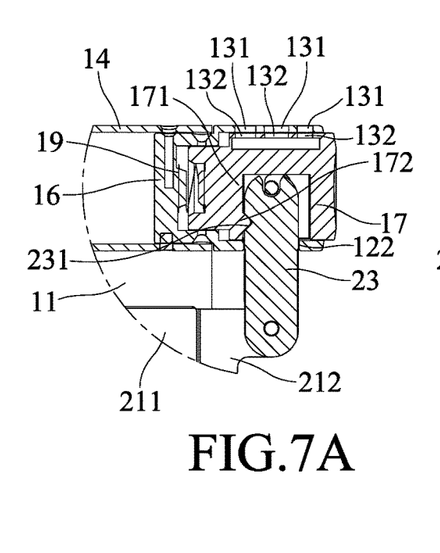
FIGS. 7A and 7B are enlarged cross sectional views showing actuation of the locking structure of an embodiment of the locking device for the notebook computer of FIG. 5.
Figure 7B:
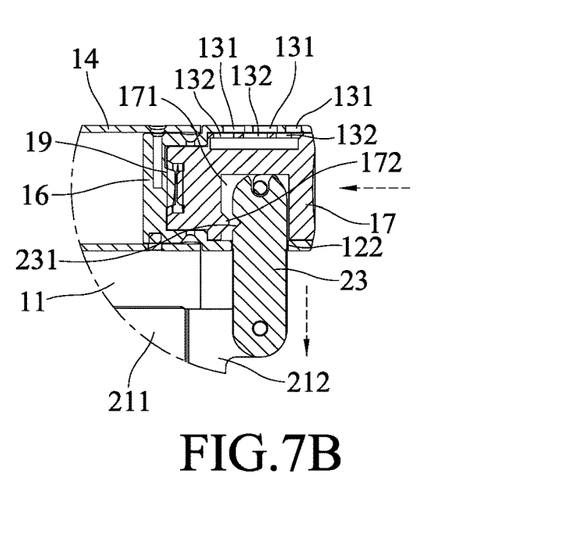
Figure 8A:
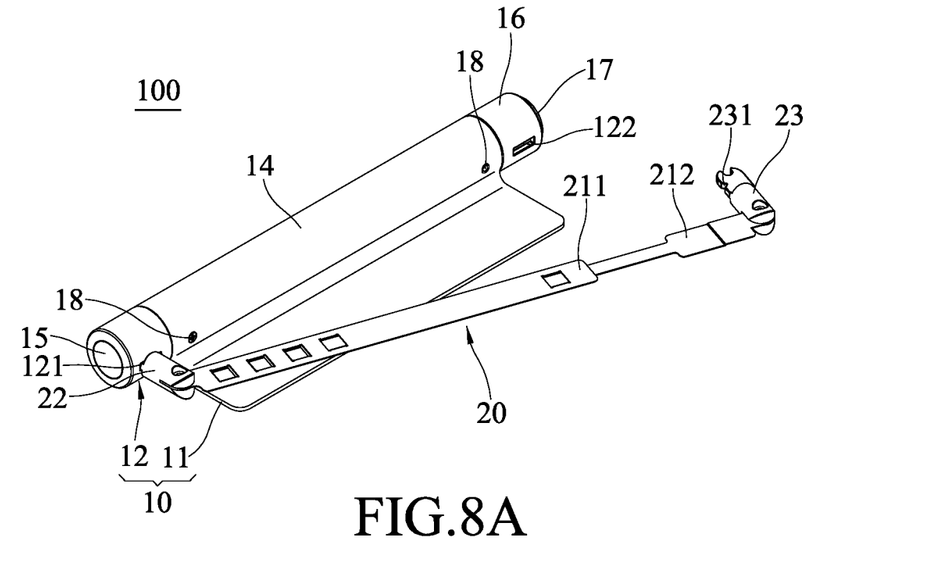
FIGS. 8A and 8B are a top and bottom perspective view respectively of an embodiment of the locking device for the notebook computer.
Figure 8B:
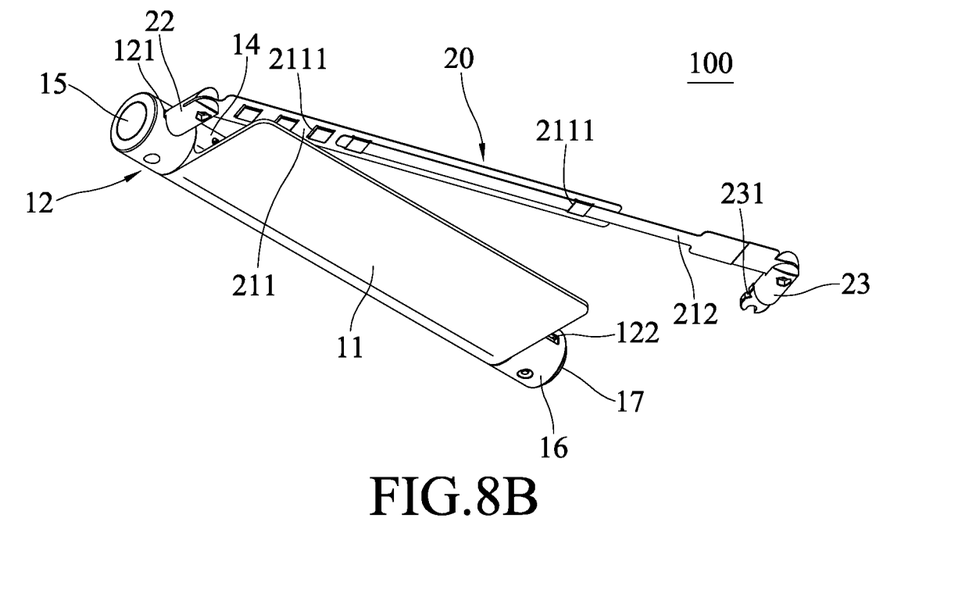
Figure 9A:
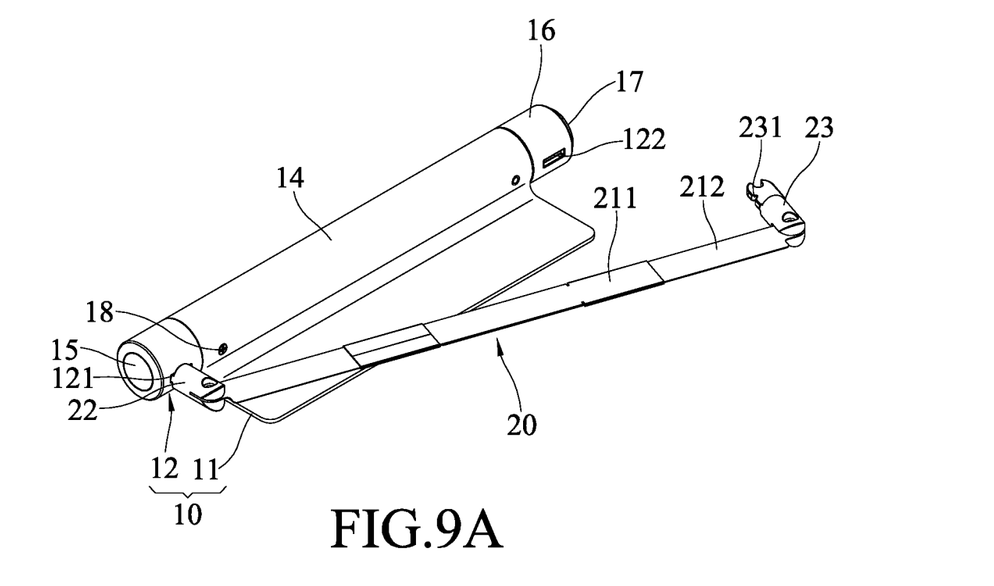
FIGS. 9A and 9B are a top and bottom perspective view respectively of an embodiment of the locking device for the notebook computer.
Figure 9B:
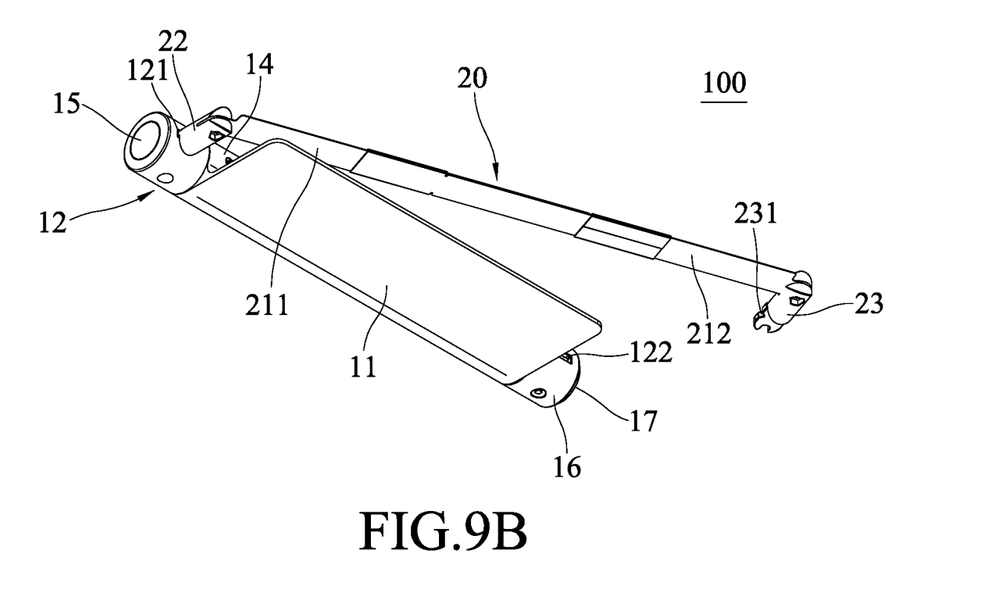
Figure 10A:
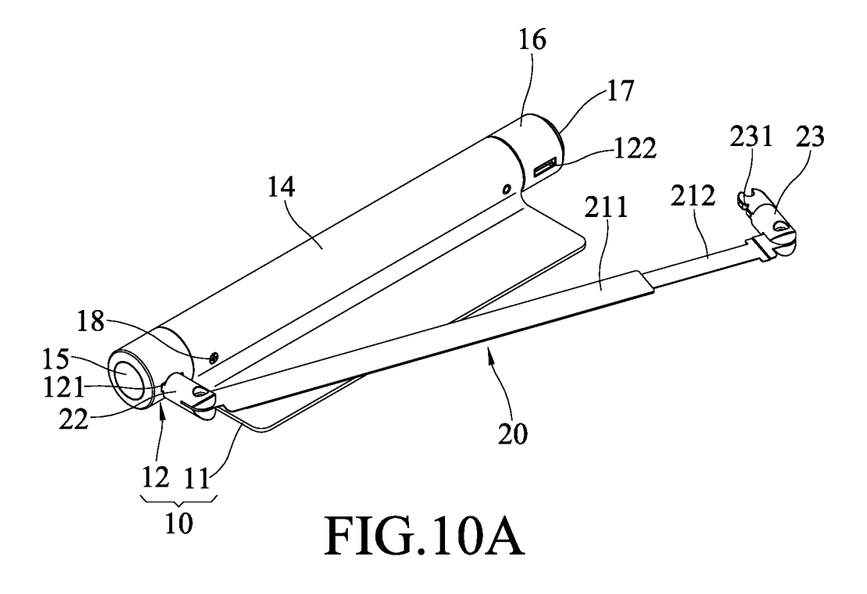
FIGS. 10A and 10B are a top and bottom perspective view respectively of an embodiment of the locking device for the notebook computer.
Figure 10B:
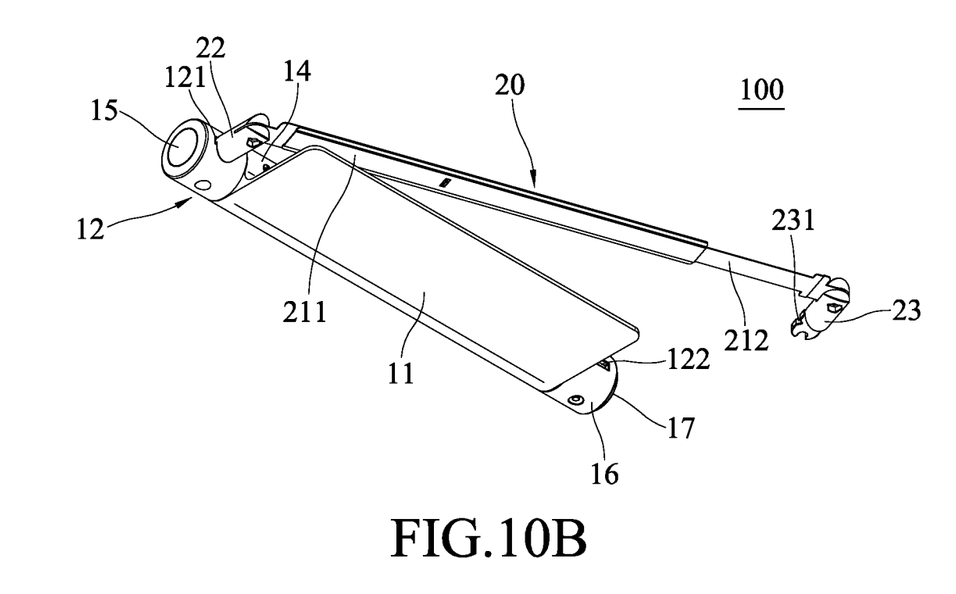

The button 17 is received in the retainer 16 and is normally located on a locking position where the second coupling post 23 is located (as illustrated in FIG. 7A), and the button 17 is released from the locking position to move toward an unlocking position (as shown in FIG. 7B) of the second coupling post 23. The retainer 16 has a resilient element 19 configured to push the button 17 so that the button 17 is located on the locking position normally.

The orifice 13 of the lock body 12 has at least one first orifice 131 defined on the retainer 16, and orifice 13 has at least one second orifice 132 defined on the button 17, wherein number of second orifice 132 is equal to the number of one first orifice 13. When the button 17 is located on the locking position, the at least one first orifice 131 aligns with the at least one second orifice 132 respectively.

When at least one first orifice 131 aligns with at least one second orifice 132 respectively, the cable lock 40 is connected with the at least one orifice 13 so as to be fixed on the fixer 10, and the cable lock 40 is connected with an object via a cable 41.

At least one first orifice 131 of the retainer 16 has different sizes, and at least one first orifice 132 of the button 17 has different sizes.

The button 17 has an accommodation groove 171 defined therein and communicating with the second receiving aperture 122, and the button 17 has an engagement protrusion 172 extending to the accommodation groove 171, wherein the second coupling post 23 has a notch 231 corresponding to the engagement protrusion 172.

Thereby, the locking device 100 is connected on the notebook computer 30 by ways of the fixer 10 and the rotatable connection rod 20, and the cable lock 40 is fixed on the fixer 10 so that the notebook computer 30 is locked with an object, such as a post or a table leg.

The rod body 21 has the first plate 211 rotatably connected with the first coupling post 22, and the rod body 21 has the second plate 212 rotatably connected with the second coupling post 23. The rod body 21 is formed in different configurations as shown in FIGS. 8A and 8B, FIGS. 9A and 9B, and FIGS. 10A and 10B.

Figure 11A:
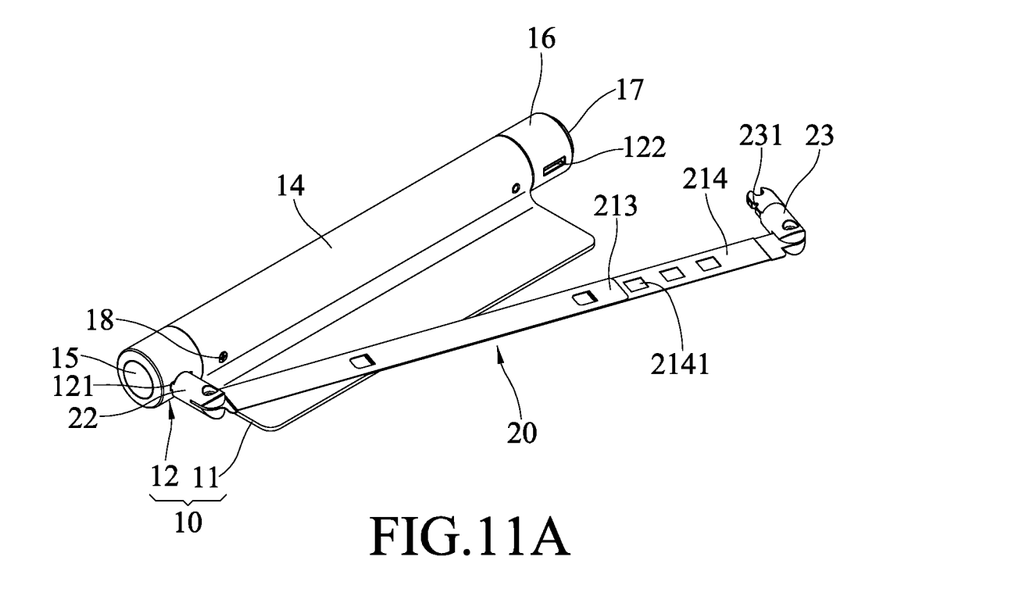
FIGS. 11A and 11B are a top and bottom perspective view respectively of an embodiment of the locking device for the notebook computer.
Figure 11B:
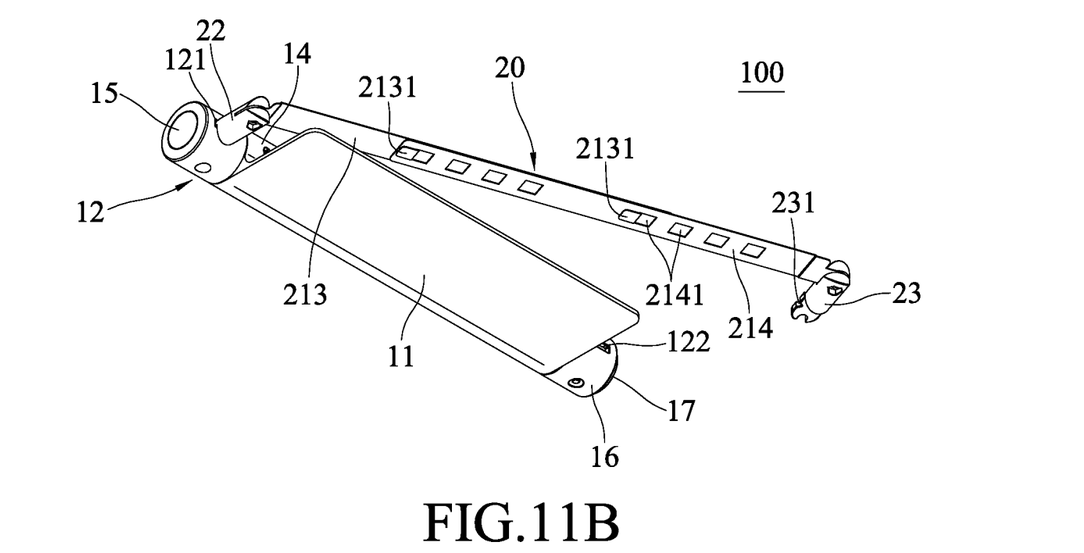

Referring to FIGS. 11A and 11B, the rod body 21 has a first plate 213 and a second plate 214 engaged with the first plate 213, wherein the first plate 213 has multiple hooks 2131, and the second plate 214 has multiple connecting holes 2141 connected with the multiple hooks 2131 respectively.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A locking device for a notebook computer comprising:
   a fixer including a bottom extension configured to support a bottom of the notebook computer, and the fixer including a lock body configured to abut against a rear end of the notebook computer, wherein the lock body having at least one orifice configured to connect with a cable lock, and the lock body having a first receiving aperture and a second receiving aperture which are formed on two sides of the lock body respectively; and
   a rotatable connection rod including a rod body rotatably arranged above a keyboard of the notebook computer, a first coupling post and a second coupling post which are rotatably connected with two ends of the rod body respectively, wherein the first coupling post is inserted into the first receiving aperture of a first side of the lock body, and the second coupling post is inserted into a second side of the lock body.

2. The locking device for the notebook computer as claimed in claim 1, wherein the lock body further includes
   a fitting tube connected on the bottom extension;
   a movable fastener connected with a first end of the fitting tube, the first receiving aperture of a first side of the lock body configured to accommodate the first coupling post;
   a retainer connected with a second end of the fitting tube and having a second receiving aperture configured to accommodate the second coupling post; and
   a button accommodated in the retainer, wherein the button is received in the retainer and is normally located on a locking position where the second coupling post is located, and the button is released from the locking position to move toward an unlocking position of the second coupling post.

3. The locking device for the notebook computer as claimed in claim 2, wherein the movable fastener is locked on the fitting tube by using a fixing element.

4. The locking device for the notebook computer as claimed in claim 2, wherein the orifice has at least one first orifice defined on the retainer, and the orifice has at least one second orifice defined on the button, wherein number of the second orifice is equal to the number of the first orifice, when the button is located on the locking position, the at least one first orifice aligns with the at least one second orifice respectively.

5. The locking device for the notebook computer as claimed in claim 4, wherein at least one first orifice of the retainer has different sizes, and the at least one first orifice of the button has different sizes.

6. The locking device for the notebook computer as claimed in claim 2, wherein the button has an accommodation groove defined therein and communicating with the second receiving aperture, and the button has an engagement protrusion extending to the accommodation groove, wherein the second coupling post has a notch corresponding to the engagement protrusion.

7. The locking device for the notebook computer as claimed in claim 2, wherein the retainer has a resilient element configured to push the button so that the button is located on the locking position normally.

8. The locking device for the notebook computer as claimed in claim 1, wherein the rod body has a first plate rotatably connected with the first coupling post, and the rod body has a second plate rotatably connected with the second coupling post.

9. The locking device for the notebook computer as claimed in claim 8, wherein the first plate has a slot configured to accommodate the second plate.

10. The locking device for the notebook computer as claimed in claim 8, wherein the first plate has multiple hooks, and the second plate has multiple connecting holes connected with the multiple hooks respectively.

* * * * *